(12) United States Patent
Wolbert et al.

(10) Patent No.: US 8,172,313 B2
(45) Date of Patent: May 8, 2012

(54) SIDE OUTER PANEL

(75) Inventors: Jeffrey Brian Wolbert, Ann Arbor, MI (US); David Takeo Nakayama, Canton, MI (US); Nigel Christopher Taylor, Highland, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 214 days.

(21) Appl. No.: 12/185,953

(22) Filed: Aug. 5, 2008

(65) Prior Publication Data

US 2010/0032986 A1 Feb. 11, 2010

(51) Int. Cl.
*B60R 13/04* (2006.01)

(52) U.S. Cl. .................. 296/193.05; 296/191

(58) Field of Classification Search .......... 296/29, 296/191, 203.03, 203.04, 193.05, 193.08, 296/198
See application file for complete search history.

(56) References Cited

U.S. PATENT DOCUMENTS

| | | | |
|---|---|---|---|
| 2,306,416 A | 12/1942 | Waterhouse, Jr. | |
| 6,086,100 A | 7/2000 | Corporon et al. | |
| 6,126,232 A | 10/2000 | Nakano | |
| 6,409,257 B1 * | 6/2002 | Takashina et al. | 296/209 |
| 7,267,395 B2 * | 9/2007 | Tomozawa | 296/203.03 |
| 2006/0158008 A1 * | 7/2006 | Nagashima | 296/203.03 |

OTHER PUBLICATIONS

How Stuff Works, Consumer Guide Automotive, http://consumerguideauto.howstuffworks.com/2006-volvo-s40-2.4I-manual-photos.htm?photo=737985&perspective=exterior.*

* cited by examiner

*Primary Examiner* — Glenn Dayoan
*Assistant Examiner* — Melissa A Black
(74) *Attorney, Agent, or Firm* — Gifford, Krass, Sprinkle, Anderson & Citkowski, P.C.

(57) ABSTRACT

A side outer panel of a vehicle having an outer surface including an outer surface edge. The outer surface edge has a predetermined curved path that provides a styling shape to add an aesthetic element to the side outer panel. The side outer panel further includes a mounting portion integrally formed thereto. The mounting portion provides a structure for attaching the side outer panel to the vehicle. In a preferred embodiment, the mounting portion includes a planar surface spaced apart from the outer surface and a step disposed between the outer surface edge and the planar surface. The planar surface at least one flange extending orthogonally therefrom to define a welding surface for welding the side outer panel to the body thereby providing structural reinforcement to the outer surface edge of the side outer panel.

3 Claims, 4 Drawing Sheets

SIDE OUTER PANEL

BACKGROUND OF THE INVENTION

1. Field of the Invention

The present invention relates to a side outer panel of a vehicle having a mounting portion that supports an outer surface edge with a predetermined curved path to present a styling shape.

2. Description of the Prior Art

Side outer panels of vehicles are made of steel and form the outer covering for the vehicle's side. The side outer panel is not only designed to provide structure and protection to passengers in the event of a collision, but is also designed to be aesthetically pleasing to vehicle owners. Accordingly, side outer panels may be stamped with various styling shapes. However, styling shapes may reduce the structure integrity of the side outer panel, specifically where a styling shape has a curvature that presents a poor surface for spot welding. For instance, certain vehicles have a side outer panel with a curved styling shape that is formed to fittingly receive a rear lamp cover.

In such vehicles, the side outer panel cannot be welded to the vehicle at any point along the curvature as a planar surface must be available for weld spots, as spot welds to curved surfaces will fail over time. Thus, tie side outer panel of these types of vehicles is not welded to a vehicle body structure where the curved styling shape exists. This makes these types of vehicles vulnerable to deformation along the curvature, and weathering as the curvature is not welded to the vehicle body and a gap is maintained between the curved portion of the styling and the vehicle body. Accordingly, it is desirable to have a side outer panel with a welding surface set apart from and integral to a styling shape so as to support various styling shapes while at the same time mitigating the potential of deformation from a predetermined impact by being welded to the vehicle body.

SUMMARY OF THE INVENTION AND ADVANTAGES

A side outer panel of a vehicle having an outer surface and an outer surface edge. The outer surface edge follows a predetermined curved path. The side outer panel further includes an addendum attached to the vehicle body structure so as to provide support for the outer surface edge of the side outer panel. The addendum includes a planar surface spaced apart from the outer surface, a step, also referenced herein as a "wall," connecting the planar surface to the outer surface edge, and at least one flange extending generally orthogonal from the planar surface so as to provide a surface for welding the side outer panel to a vehicle body structure.

BRIEF DESCRIPTION OF THE DRAWINGS

Other advantages of the present invention will be readily appreciated, as the same becomes better understood by reference to the following detailed description when considered in connection with the accompanying drawings wherein.

DETAILED DESCRIPTION OF THE INVENTION

Figure 1:
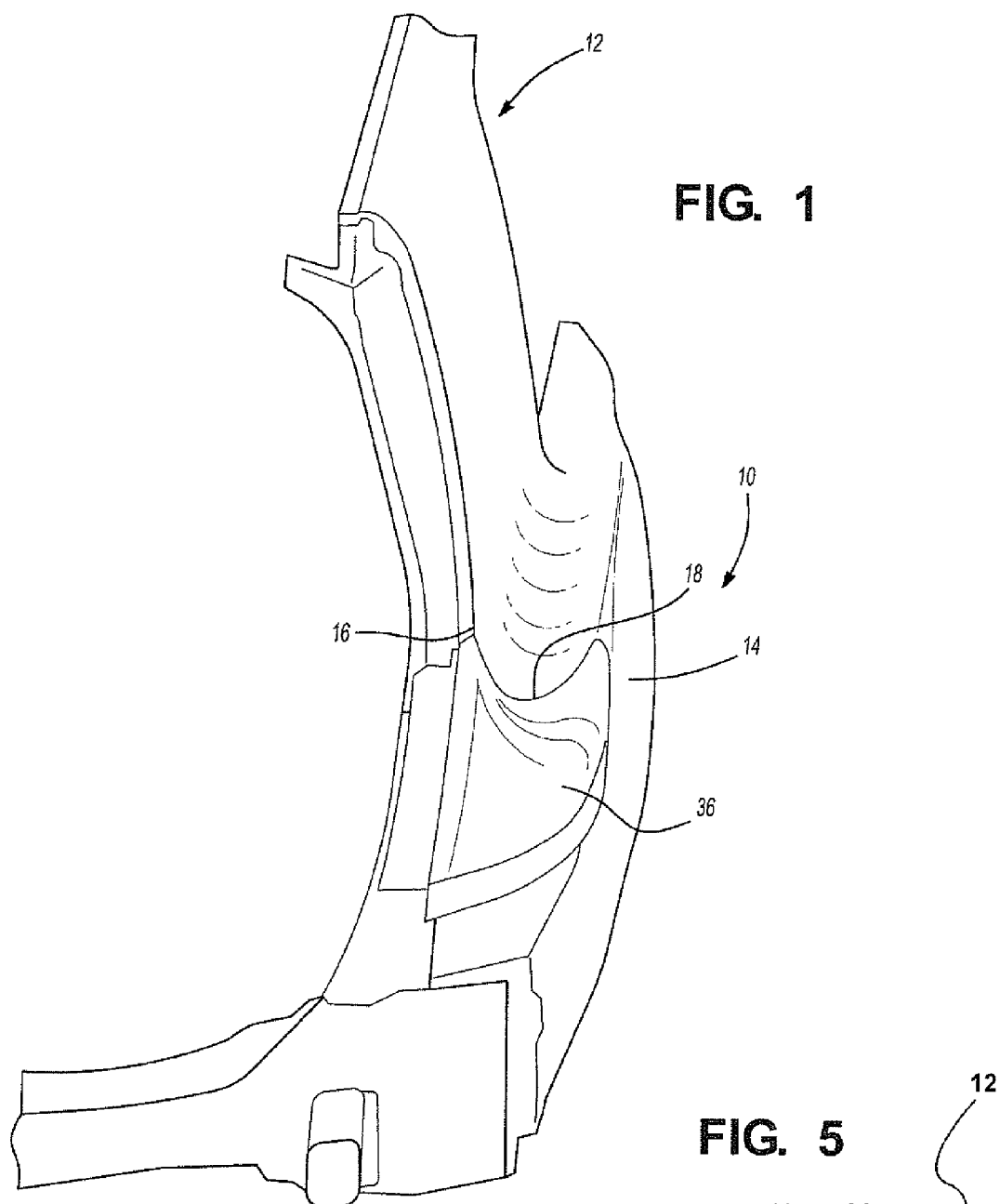
FIG. 1 is a view taken from the rear of the vehicle, showing the side outer panel and the vehicle body structure.
Figure 2:
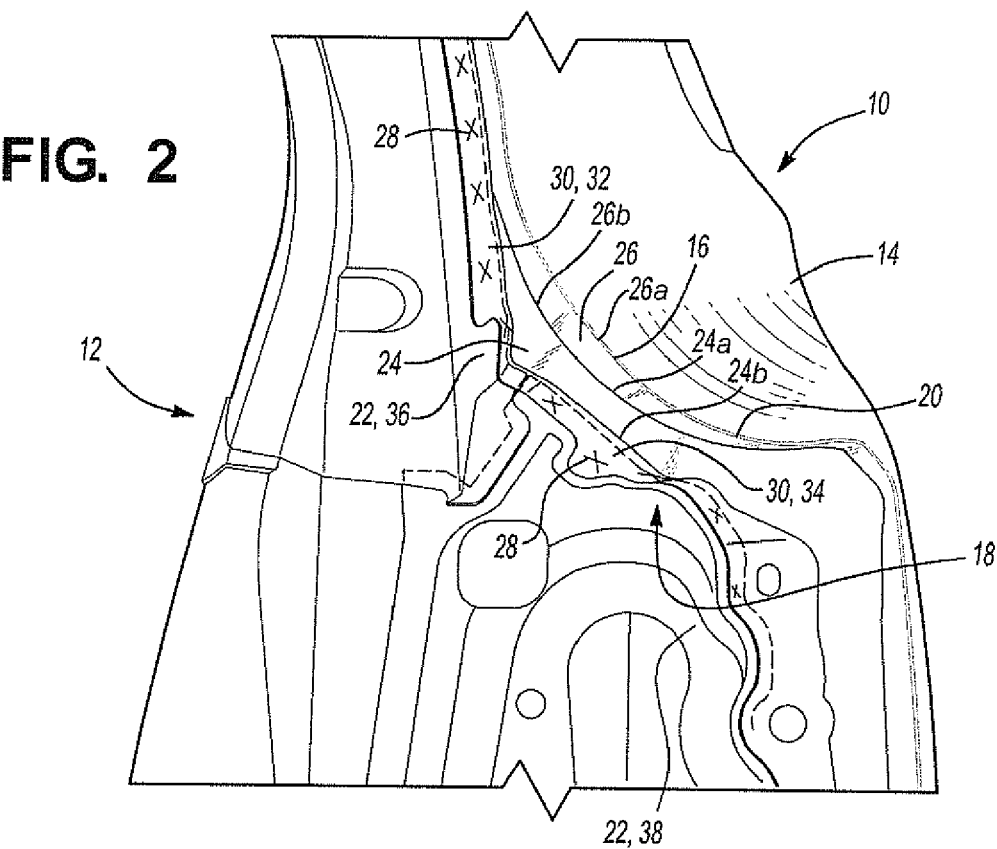
FIG. 2 is a perspective view of the of the side outer panel welded to the vehicle body structure, showing a flange, planar surface, an outer surface edge following a predetermined curved path so as to define a styling shape with curvature, the figure illustrates how the outer surface edge is set apart from the welding points by the planar surface, thus the side outer panel is able to support a styling shape regardless of the type of curvature.

Referring to the figures, wherein like numerals indicate corresponding parts throughout the several views, a side outer panel 10 of a vehicle 12 having an outer surface 14, an outer surface edge 16, and an addendum 18 (also referred to as a mounting portion) for providing structural support to the outer surface edge 16 is provided. The outer surface edge 16 defines a styling shape which adds an aesthetic value to the side outer panel 10. With reference to FIGS. 1 and 2, the outer surface edge 16 has a predetermined curved path 20, and extends into the addendum 18. The predetermined curved path 20 extends down and outward with reference to the center of the vehicle 12. The addendum 18 allows the side outer panel 10 to be mounted to a vehicle body structure 22 so as to provide support for the outer surface edge 16. Thus unlike vehicles 12 of the prior art, the styling shape is directly supported by the vehicle body structure 22 via the addendum 18 and no gap exists between the styling shape and the vehicle body structure 22.

Figure 5:
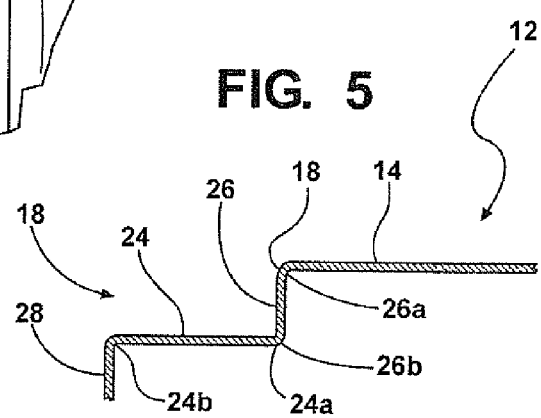
FIG. 5 is a cross section of the side outer panel of FIG. 4 taken along lines 5-5.
Figure 4:
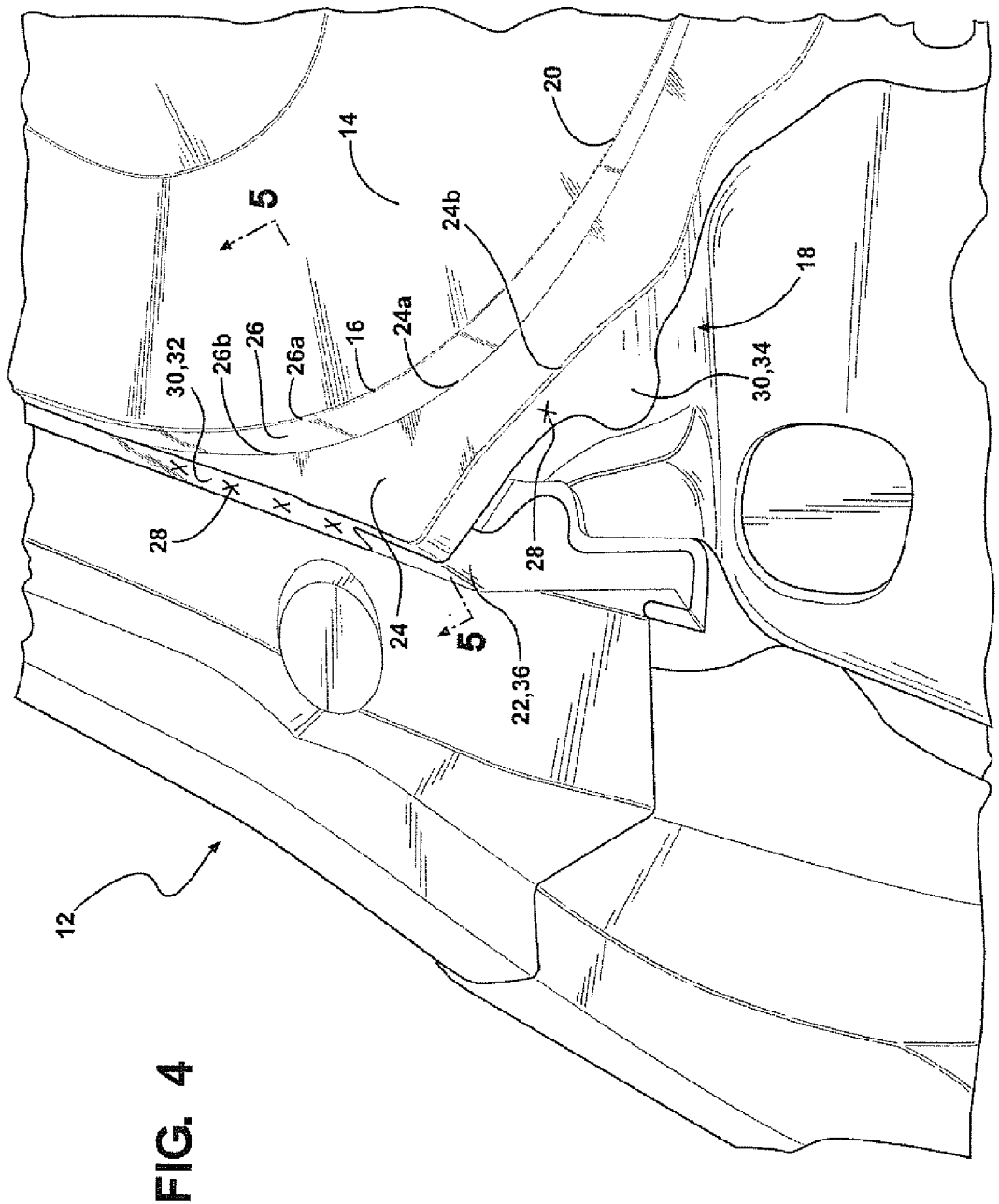
FIG. 4 is another perspective view of the side outer panel showing the outer surface edge having a predetermined curved path following a radius disposed on the outer surface so as to be convex with respect to the longitudinal axis of the vehicle.

With reference now to FIGS. 2 and 4, the addendum 18 includes a planar surface 24 spaced apart from the outer surface 14, a step 26 connecting the planar surface 24 to the outer surface edge 16, and at least one flange 28 extending generally orthogonal from the planar surface 24 so as to provide a welding surface 30 for welding the side outer panel 10 to a vehicle body structure 22. As stated above the step 26 is disposed between the planar surface 24 and the outer surface edge 16 so as to place the planar surface 24 beneath and generally parallel to the plane on which the outer surface 14 lies when the side outer panel 10 is attached to the vehicle body structure 22. Specifically, the step 26 extends from the outer surface edge 16 to the planar surface 24 and is generally orthogonal to both the outer surface edge 16 and the planar surface 24, as shown in FIG. 5.

The flange 28 extends generally orthogonal from the planar surface 24 and presents a welding surface 30 for welding the addendum 18 to the vehicle body structure 22 so as to secure the side outer panel 10 thereto. In the first preferred embodiment the addendum 18 includes a first flange 32 and a second flange 34 for attaching to the vehicle body structure 22. Specifically, the first and second flanges 32, 34 are welded to the pillar trough 36 and lamp housing structure 38 respectively. Thus, the first flange 32 and the second flange 34 are also generally orthogonal to each other so as to be fittingly received by the pillar trough 36 and lamp housing structure 38. However, it is understood that the angular relationship of the first flange 32 to the second flange 34 is dependent upon the disposition of the vehicle 12 structure to which the first and second flanges 32, 34 are to be welded to.

Figure 3:
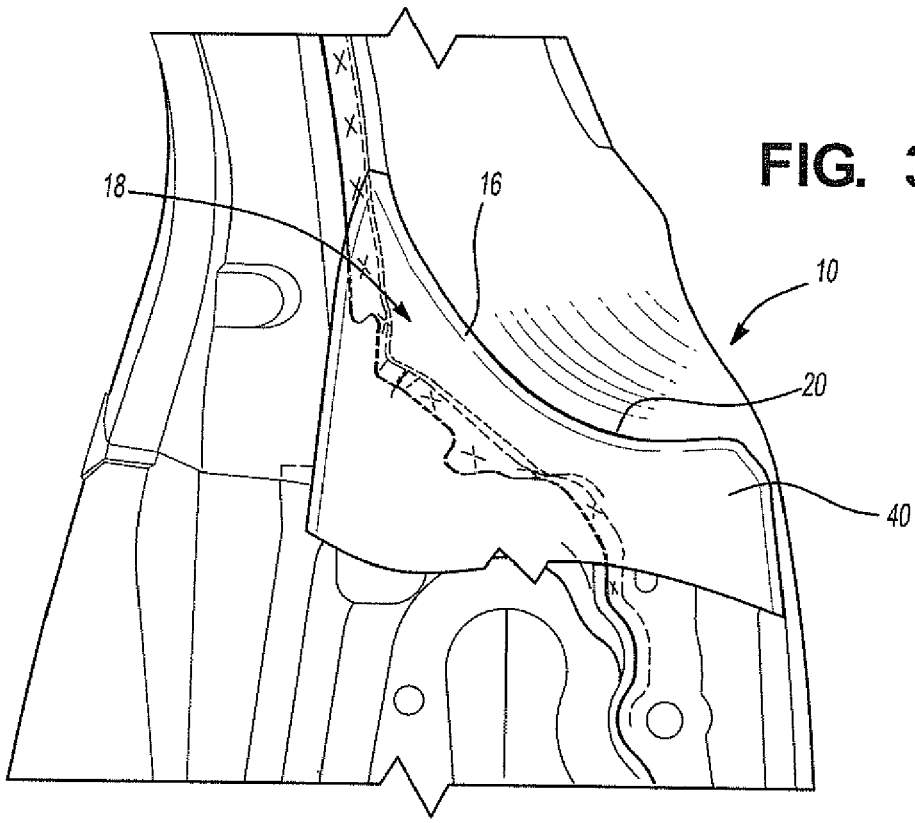
FIG. 3 is a perspective view of the side outer panel having an outer surface edge, wherein the side outer panel is mounted to the vehicle body and a rear lamp cover is fittingly aligned to the outer surface edge.
Figure 3A:
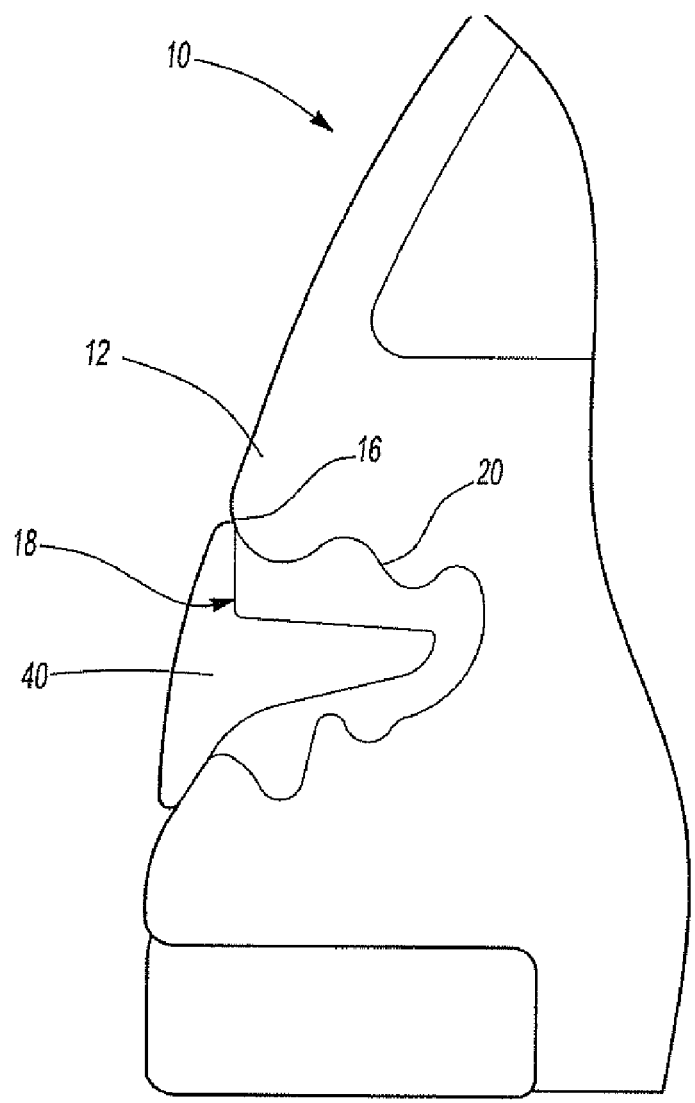
FIG. 3a is a perspective view of the side outer panel having a an outer surface edge with a different curvature than FIG. 3 mounted to the vehicle body to illustrate that the side outer panel disclosed herein is capable of supporting any curvature styling.

With reference now to FIG. 2, the side outer panel 10 includes an outer surface 14 having an outer surface edge 16. The outer surface edge 16 has a predetermined curved path 20 to define a styling shape. In one instance the predetermined curved path 20 is defined by an arc length pivoting about a fixed point. Thus the predetermined curved path 20 does not present a sufficient planar surface 24 for spot welding. However, it is anticipated that the curved path does not need to be necessarily defined by a radius of a fixed length. The predetermined curved path 20 may be also defined by a variable radius length pivoting about a fixed point, thus presenting a styling shape as shown in FIG. 3a.

The outer surface 14 and the outer surface edge 16 are both spaced apart from the planar surface 24 of the addendum 18. Thus when the side outer panel 10 is installed onto the vehicle 12, the outer surface 14 and outer surface edge 16 are fittingly aligned to the rear lamp cover 40 and is visible to people, as shown in FIGS. 3 and 3a. Though the predetermined curved path 20 of the outer surface edge 16 is shown as having a generally swoosh shape, it is understood that the outer surface edge 16 can follow other paths. The purpose of the predetermined curved path 20 is to provide the outer surface 14 with a shape that is fittingly aligned to the design shape of a rear lamp cover 40, as shown in FIG. 3a.

The welding surface 30 of the addendum 18 is shown welded to the vehicle body structure 22, specifically the pillar trough 36 and lamp housing structure 38. Thus, with reference to both FIGS. 2 and 3, it is shown that the flanges 28 are integral to the planar surface 24 of the addendum 18 and in alignment with the vehicle body structure 22 to which the flanges 28 are to be welded to. The welding surface 30 of the first and second flange 32, 34 provides an assembly worker with an area for which to secure the side outer panel 10 to the vehicle 12 by means of a spot weld. Thus, the planar surface 24 separates the flanges 28 from the outer surface edge 16, and when the side outer panel 10 is welded to the vehicle body structure 22, the planar surface 24 is disposed beneath the exposed styling shape and is partially hidden by the addition of a lamp cover.

The addendum 18 is integrally formed to the side outer panel 10 and provides structural support for the outer surface edge 16 thereby allowing a manufacturer/designer to give the side outer panel 10 an outer surface edge 16 having a curved path and thus overcomes the problems of the prior art. Specifically, the addendum 18 provides the side outer panel 10 with a structure for welding the side outer panel 10 to the vehicle body structure 22. Since the addendum 18 is integrally formed to the side outer panel 10, the side outer panel 10 is able to support an outer surface edge 16 with a curved path. This allows the manufacturer/designer to design the outer surface edge 16 in any manner while at the same time ensuring that the outer surface edge 16 is reinforced and structurally stable, as shown in FIG. 3a. Thus, the side outer panel having the outer surface edge 16 with a predetermined curved path 20 disclosed herein is more durable than the side outer panel having a styling shape with curvature of the prior art. Furthermore, the side outer panel 10 disclosed herein, unlike that of the prior art, is not as vulnerable to weathering as a tight seal is formed between the side outer panel 10 and the lamp housing structure 38 by operation of the welding therebetween.

Obviously, many modifications and variations of the present invention are possible in light of the above teachings and may be practiced otherwise than as specifically described while within the scope of the appended claims.

What is claimed is:

1. A side outer panel of a vehicle, the side outer panel is attached to a vehicle body structure, the side outer panel comprising:

an outer surface having an outer surface edge, the outer surface edge having a predetermined curved path following a radius disposed on the outer surface so as to be convex with respect to the longitudinal axis of the vehicle; and a mounting portion integrally formed to the side outer panel, the mounting portion having a wall and a planar surface, the wall extending between the outer surface and the planar surface, the wall having a first side edge opposite a second side edge, the first side edge of the wall extends along the outer surface edge following the predetermined curved path, the planar surface having a distal edge opposite a proximal edge, the proximal edge of the planar surface formed to the second side edge of the wall and disposed generally orthogonal to the wall, the mounting portion further including a first flange extending generally orthogonal from the distal edge of the planar surface, the first flange for attaching the side outer panel to the vehicle body structure.

2. The side outer panel as set forth in claim 1, further including a second flange generally orthogonal to the first flange.

3. The side outer panel as set forth in claim 2, wherein the second flange lies in a plane generally parallel to the planar surface of the mounting portion.

* * * * *

UNITED STATES PATENT AND TRADEMARK OFFICE
CERTIFICATE OF CORRECTION

PATENT NO. : 8,172,313 B2  
APPLICATION NO. : 12/185953  
DATED : May 8, 2012  
INVENTOR(S) : Jeffrey Brian Wolbert et al.

Page 1 of 1

It is certified that error appears in the above-identified patent and that said Letters Patent is hereby corrected as shown below:

In the Specification

Col. 1, line 27: replace "Thus, tie side" with --Thus, the side--

Signed and Sealed this  
Third Day of December, 2013

Margaret A. Focarino  
*Commissioner for Patents of the United States Patent and Trademark Office*